United States Patent
Delmas et al.

(10) Patent No.: US 10,904,004 B2
(45) Date of Patent: Jan. 26, 2021

(54) USER-SESSION MANAGEMENT IN A ZERO-KNOWLEDGE ENVIRONMENT

(71) Applicant: Dashlane SAS, Paris (FR)

(72) Inventors: William Delmas, Paris (FR); Guillaume Maron, Paris (FR); Cyril Leclerc, Paris (FR); Frédéric Rivain, Paris (FR)

(73) Assignee: DASHLANE SAS, Paris (FR)

( * ) Notice: Subject to any disclaimer, the term of this patent is extended or adjusted under 35 U.S.C. 154(b) by 214 days.

(21) Appl. No.: 16/055,358

(22) Filed: Aug. 6, 2018

(65) Prior Publication Data
US 2019/0268156 A1    Aug. 29, 2019

Related U.S. Application Data

(60) Provisional application No. 62/635,667, filed on Feb. 27, 2018.

(51) Int. Cl.
*H04L 9/32* (2006.01)
*H04L 29/06* (2006.01)
(Continued)

(52) U.S. Cl.
CPC ............ *H04L 9/3226* (2013.01); *G06F 21/31* (2013.01); *H04L 9/0844* (2013.01);
(Continued)

(58) Field of Classification Search
CPC ... H04L 9/3226; H04L 9/0844; H04L 9/0894; H04L 9/3218; H04L 9/3247;
(Continued)

(56) References Cited

U.S. PATENT DOCUMENTS

| | | |
|---|---|---|
| 5,434,918 A | 7/1995 | Kung et al. |
| 5,495,533 A | 2/1996 | Linehan et al. |

(Continued)

OTHER PUBLICATIONS

Apple Technical White Paper, "Best Practices for Deploying FileVault 2", Aug. 2012, OS X 10.7.4, 42 pages.
(Continued)

*Primary Examiner* — Kristine L Kincaid
*Assistant Examiner* — Alexander R Lapian (57) ABSTRACT

Examples of the present disclosure describe systems and methods relating to user-session management in a zero-knowledge environment. When a user authenticates with a computing service to begin a session, a credential-cipher key is used to encrypt the user's authentication credentials, thereby generating session-resume data. The computing service stores the credential-cipher key, such that it is not retained by the user's computing device. Accordingly, when the user resumes the session, a resume request is generated to retrieve the credential-cipher key from the computing service, wherein the request is validated before providing the key. Upon successful validation, the computing service provides the credential-cipher key, which is then used to decrypt the session-resume data and regain access to the user's authentication credentials. The encrypted user data may then be decrypted, thereby obviating the need for the user to re-authenticate, while still retaining the privacy and security benefits of the zero-knowledge environment.

20 Claims, 8 Drawing Sheets

(51) Int. Cl.
*G06F 21/31* (2013.01)
*H04L 29/08* (2006.01)
*H04L 9/08* (2006.01)

(52) U.S. Cl.
CPC .......... *H04L 9/0894* (2013.01); *H04L 9/3218* (2013.01); *H04L 9/3247* (2013.01); *H04L 63/0428* (2013.01); *H04L 63/083* (2013.01); *H04L 67/14* (2013.01)

(58) Field of Classification Search
CPC . H04L 9/3221; H04L 63/0428; H04L 63/083; H04L 67/14; G06F 21/31
See application file for complete search history.

(56) References Cited

U.S. PATENT DOCUMENTS

| | | | |
|---|---|---|---|
| 5,560,008 A | 9/1996 | Johnson et al. | |
| 5,684,951 A | 11/1997 | Goldman et al. | |
| 6,044,155 A | 3/2000 | Thomlinson et al. | |
| 7,472,423 B2 | 12/2008 | DeCenzo et al. | |
| 8,006,280 B1 | 8/2011 | Hildebrand et al. | |
| 8,028,329 B2 | 9/2011 | Whitcomb | |
| 8,059,818 B2 | 11/2011 | Asokan et al. | |
| 8,601,600 B1 | 12/2013 | Shankar | |
| 8,990,888 B2 | 3/2015 | Busser | |
| 9,330,245 B2 | 5/2016 | Maron | |
| 10,546,142 B2 | 1/2020 | Hakhinian | |
| 2002/0122553 A1 | 9/2002 | Kao | |
| 2003/0177401 A1 | 9/2003 | Arnold | |
| 2004/0123159 A1 | 6/2004 | Kerstens et al. | |
| 2004/0187018 A1 | 9/2004 | Owen et al. | |
| 2005/0222963 A1 | 10/2005 | Johnson | |
| 2005/0228994 A1 | 10/2005 | Kasai et al. | |
| 2006/0235796 A1 | 10/2006 | Johnson et al. | |
| 2007/0011724 A1 | 1/2007 | Gonzalez et al. | |
| 2007/0192841 A1 | 8/2007 | Kim | |
| 2008/0104709 A1 | 5/2008 | Averyt et al. | |
| 2008/0155276 A1 | 6/2008 | Chen et al. | |
| 2008/0216153 A1 | 9/2008 | Aaltonen | |
| 2009/0235346 A1 | 9/2009 | Steinberg | |
| 2009/0288143 A1 | 11/2009 | Stebila et al. | |
| 2010/0005287 A1 | 1/2010 | Rollins | |
| 2010/0017616 A1 | 1/2010 | Nichols et al. | |
| 2010/0083358 A1 | 4/2010 | Govindarajan et al. | |
| 2010/0100945 A1 | 4/2010 | Ozzie et al. | |
| 2010/0172504 A1 | 7/2010 | Allen | |
| 2010/0174911 A1 | 7/2010 | Isshiki | |
| 2010/0228987 A1 | 9/2010 | Dinov | |
| 2011/0009092 A1 | 1/2011 | Etchegoyen | |
| 2011/0252243 A1 | 10/2011 | Brouwer | |
| 2012/0072979 A1 | 3/2012 | Cha et al. | |
| 2012/0117455 A1 | 5/2012 | Fogel et al. | |
| 2012/0131656 A1 | 5/2012 | Slaton et al. | |
| 2012/0192253 A1 | 7/2012 | Betsch et al. | |
| 2012/0323717 A1 | 12/2012 | Kirsch | |
| 2013/0111217 A1 | 5/2013 | Kopasz et al. | |
| 2013/0145447 A1 | 6/2013 | Maron | |
| 2013/0205360 A1* | 8/2013 | Novak | H04L 63/0815 726/1 |
| 2013/0318581 A1 | 11/2013 | Counterman | |
| 2017/0093805 A1* | 3/2017 | Proulx | H04L 63/0876 |
| 2017/0093839 A1* | 3/2017 | Whiteside | H04L 9/32 |
| 2018/0013562 A1 | 1/2018 | Haider | |
| 2018/0323970 A1 | 11/2018 | Maron | |
| 2019/0149332 A1 | 5/2019 | Rivain et al. | |
| 2019/0356649 A1 | 11/2019 | Alwen | |
| 2020/0280452 A1* | 9/2020 | Pahl | H04L 9/0841 |

OTHER PUBLICATIONS

Dashlane Security Whitepaper, Nov. 2011, https://www.dashlane.com/download/Security-Whitepaper-Final-Nov-2011.pdf., 9 pages.
"LastPass Gets the Green Light from Security Now!'s Steve Gibson", LastPass Blog, (http://blog.lastpass.com/2010/07/lastpass-gets-green-light-from-security.html), Jul. 21, 2010, 11 pages.
Encryption—How does LastPass store my passwords on their website?, Stack Exchange, (http://webapps.stackexchange.com/questions/11361/how-does-lastpass-store-my-passwords-on-their-website), Jan. 16, 2011, 2 pages.

* cited by examiner

USER-SESSION MANAGEMENT IN A ZERO-KNOWLEDGE ENVIRONMENT

CROSS-REFERENCE TO RELATED APPLICATION

This application claims priority to U.S. Provisional Application No. 62/635,667, entitled "User Session Management in a Zero Knowledge Environment," filed on Feb. 27, 2018, the entire disclosure of which is hereby incorporated by reference in its entirety.

BACKGROUND

When first logging into a traditional computing service, a "remember me" or session-resume feature is typically available, thereby allowing a user to resume a session with the computing service via a locally stored session token without needing to subsequently provide authentication credentials (e.g., a password, cryptographic key, etc.) before doing so. However, implementing such functionality in the context of a zero-knowledge environment is difficult and more risky, as a locally stored session token would enable a bad actor to gain access to the user's data without a time limitation usually used by traditional session-resume features. Further, if such information is stored server-side, the computing service would be able to access the user's data, thereby eliminating the zero-knowledge nature of the environment.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods relating to user-session management in a zero-knowledge environment. When a user initially authenticates with a computing service and begins a session with the computing service, session-resume data comprising an encrypted representation of a user's authentication credentials are generated. Upon subsequent access attempts, the user is then able to resume the session and decrypt associated user data without subsequently prompting the user for the authentication credentials. The authentication credentials are encrypted using a credential-cipher key, which is stored by the computing service and is not retained by the user's computing device.

Accordingly, when the user resumes the session, the credential-cipher key is retrieved from the computing service via a resume request, such that the computing service may validate the resume request. Upon successful validation, the computing service provides the credential-cipher key to the user's device, which is then used to decrypt the session-resume data and regain access to the user's authentication credentials. The authentication credentials are then used to decrypt encrypted user data and resume the user's session, thereby obviating the need for the user to provide the authentication credentials, while still retaining the privacy and security benefits of the zero-knowledge environment.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

When first logging into a computing service, a user is typically provided with a "remember me" option to resume a session, which will store a session token associated with the user's session on the user's computing device, thereby eliminating the need for the user to provide authentication credentials when subsequently accessing the computing service. Rather, the session token is used to prove the identity of the user and to access data and functionality associated with the computing service. By contrast, in a "zero-knowledge" environment, the computing service and other parties are unable to access at least a part of the user data. This is typically achieved by encrypting the user data with a credential that is not known to the computing service. However, applying traditional session-resume techniques to such a zero-knowledge environment would entail storing the credential useable to decrypt and access the user data, thereby reducing or eliminating the security afforded by the zero-knowledge aspects of the environment.

Accordingly, aspects disclosed herein relate to user-session management in a zero-knowledge environment. In an example, user data for an application of a computing service is encrypted on a user computing device using a master password. Thus, when the application communicates the encrypted user data to the computing service, the data is opaque to the computing service, such that the computing service is unable to access the plaintext content of the user data, and may instead only have access to the encrypted representation of the user data. In order to provide "remember me" or session-resume functionality for such a computing service (e.g., such that the user need not enter the master password to decrypt the user data and resume the user's session), simply storing the master password on the user device and/or providing the master password to the computing service is insufficient, as it would reduce or eliminate the security benefits afforded by the zero-knowledge environment. For example, such techniques are problematic in unsecure environments that fail to offer secure storage options, such as system-protected storage or a system keychain. However, even in the presence of such secure storage options, locally storing the master password still presents security risks, including, but not limited to, the inability to revoke access if the user device is lost and the potential for malicious software to gain access to the stored master password and, by extension, the user's data.

Instead, a credential-cipher key is used to encrypt the user's master password, thereby generating session-resume data comprising the ciphered master password. The session-resume data may be stored locally by the user computing device, such that it may later be decrypted by the application and used to resume the user session (e.g., to decrypt and access the encrypted user data). In order to retain the zero-knowledge aspects of the environment, the credential-cipher key is deleted from the user computing device, and is instead retained by the computing service. As a result, it is not possible to decrypt the user data without either: 1) the user providing the master password used to encrypt the user data; or 2) decrypting the session-resume data comprising the ciphered master password, which would require access to the credential-cipher key. Thus, the master password is not stored in plaintext on the user computing device, nor does the computing service have access to the master password, thereby maintaining the zero-knowledge environment described above. While examples are described herein with respect to encrypting a master password usable to decrypt the encrypted user data, it will be appreciated that similar techniques may be applied to a cryptographic key used to encrypt the user data, or any of a variety of other such authentication credentials.

When the user session is subsequently resumed (e.g., by reopening the application, by accessing the application after a period of time, etc.), the application communicates with the computing service to gain access to the credential-cipher key. In examples, the application provides identifying information associated with the device and/or the user. The computing service may verify the identity of the application, the device, and/or the user, and may provide the credential-cipher key accordingly, thereby enabling the application to resume the user session and gain access to the encrypted user data. In some examples, the computing service may not provide the credential-cipher key, such as in instances where the session-resume functionality is limited to a fixed period of time that has already elapsed (e.g., two weeks from the user initially providing the master password, five days of inactivity, etc.). In other examples, the computing service does not provide the credential-cipher key as a result of a previously received user indication that the user computing device associated with the credential-cipher key has been lost or stolen, such that the session associated with the user computing device is invalidated and cannot be resumed. In such instances, and instances where the computing service is inaccessible (e.g., lack of network connectivity, downtime on the part of the computing service, etc.), the user is instead prompted to re-enter the master password in order to gain access to the encrypted user data.

Figure 1:
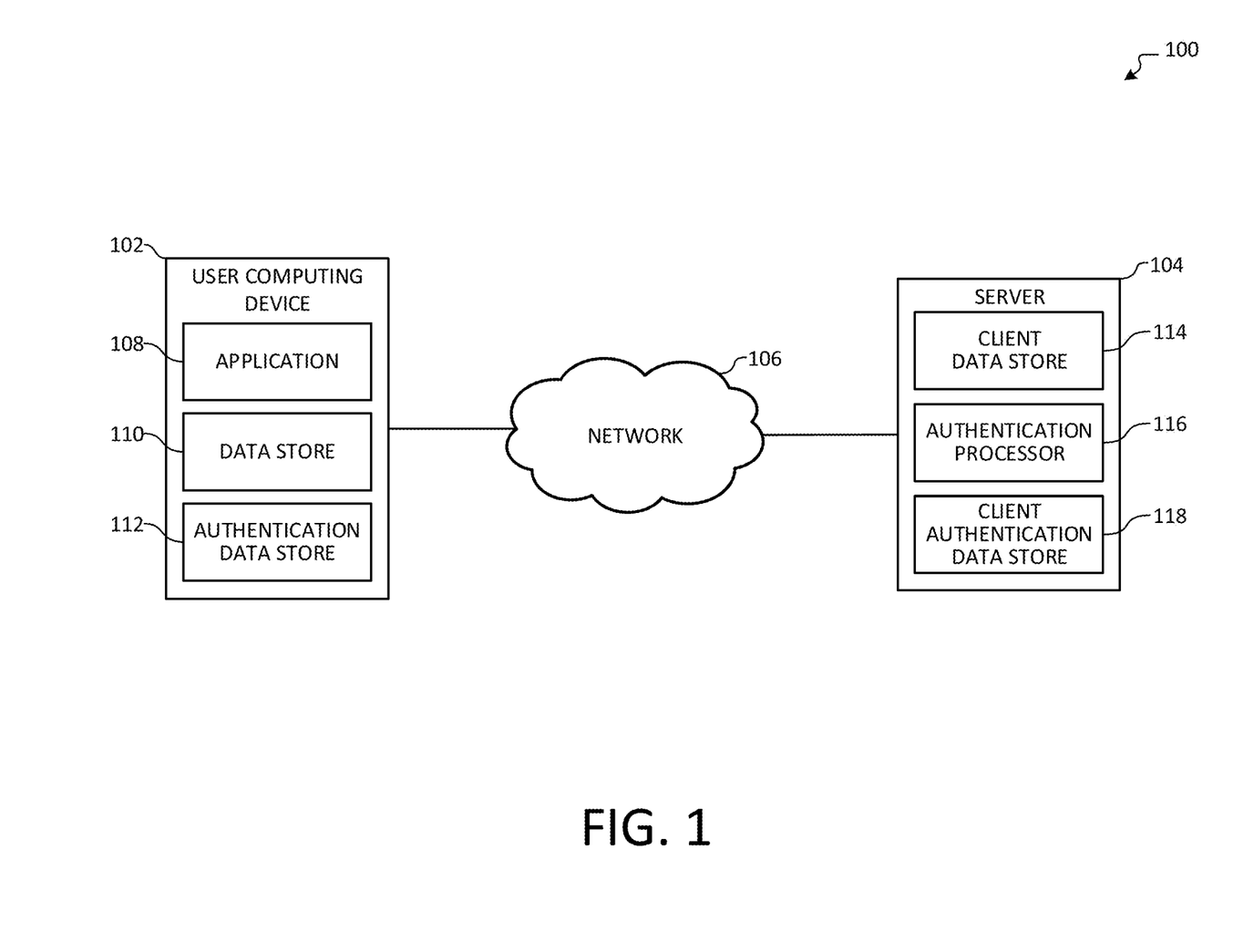
FIG. 1 illustrates an overview of an example system for user-session management in a zero-knowledge environment.

FIG. 1 illustrates an overview of an example system 100 for user-session management in a zero-knowledge environment. As illustrated, system 100 comprises user computing device 102, server 104, and network 106. In an example, user computing device 102 is a mobile computing device, a tablet computing device, a laptop computing device, a desktop computing device, or a personal computing device, among other computing devices. Server 104 may be a computing device, including, but not limited to, a desktop computing device, a server computing device, or a distributed computing device, among other computing devices. In some examples, server 104 provides aspects of a computing service. As used herein, a computing service may comprise an online service (e.g., comprising one or more servers accessible via a network connection, a website, and/or a client application, etc.) or a standalone locally executable application, or a combination thereof. While user computing device 102 and server 104 are illustrated as one element in system 100, it will be appreciated that multiple computing devices may be used to provide the functionality discussed herein.

User computing device 102 and server 104 are communicatively connected using network 106. In an example, network 106 may be a local area network, a wide area network, or the Internet, or any combination thereof, among other networks. In some examples, user computing device 102 and server 104 may communicate with each other by way of network 106. While example communications between user computing device 102 and sever 104 are discussed herein, it will be appreciated that other examples may comprise alternative communications.

User computing device 102 comprises application 108, data store 110, and authentication data store 112. Application 108 may be used by a user of user computing device 102 to use or otherwise access a computing service provided by server 104. As an example, application 108 may be a password manager that synchronizes with one or more other user computing devices (not pictured) via server 104. In another example, application 108 may be a secure messaging application that communicates with other users of the secure messaging application using server 104. It will be appreciated that any of a variety of applications and/or computing services may be used according to aspects disclosed herein, including, but not limited to, web applications, plugins, locally executable applications, etc. Information from application 108 may be stored locally in data store 110 and/or remotely in client data store 114 of server 104.

In an example, user data stored by application 108 in data store 110 and/or client data store 114 is encrypted, such that the user data is opaque to server 104, thereby providing a zero-knowledge environment. In other examples, user data stored in data store 110 and/or client data store 114 is encrypted using a master password, a cryptographic key, or a combination thereof, among other authentication credentials. In some examples, a cryptographic key may be a symmetric key, or it may be an asymmetric key pair comprised of a public key and a private key. A variety of cryptographic algorithms may be used, including, but not limited to, Advanced Encryption Standard (AES), Data Encryption Standard (DES), Rivest-Shamir-Adleman (RSA), and Elliptic Curve Cryptography (ECC), among others.

Data in data store 110 and/or client data store 114 may be accessed by application 108, wherein application 108 may prompt a user of user computing device 102 for authentication credentials (e.g., a password, a cryptographic key, or any combination thereof, etc.). Based on the received authentication credentials, application 108 may be able to decrypt the user data and provide functionality based on the decrypted data. According to aspects disclosed herein, a credential-cipher key is used to generate session-resume data comprising a ciphered master password based on the user's authentication credentials, which may be used to subsequently regain access to the user's encrypted data without necessarily prompting the user for the authentication credentials, thereby providing "remember me" or session-resume functionality.

In examples, the user may select a "remember me" checkbox to enable such functionality. In some examples, the user may specify specific criteria that are evaluated when determining to resume a session, such as ensuring the credential-cipher key is provided only to a user device having a specific IP address or is provided in response to a resume request issued during certain hours, among other examples. When the user successfully authenticates with application 108 (e.g., as a result of entering the correct master password, providing the correct cryptographic key, etc.), application 108 may communicate with authentication processor 116 to obtain a session key. In an example, the session key comprises a cryptographic key as described herein, which may be associated with the user's session for application 108 on user computing device 102. In some examples, the session key comprises a globally unique identifier (GUID) or other identifier, or a fingerprint associated with the cryptographic key may be used as the identifier. The session key may be stored by server 104 in client authentication data store 118 and/or by user computing device 102 in authentication data store 112. It will be appreciated that authenticating with application 108 may be a local operation and/or may comprise communication with server 104.

Application 108 may generate a credential-cipher key, which may be used to encrypt the authentication credentials used to access data store 110 and/or client data store 114 as described herein. In an example, application 108 signs the credential-cipher key using the session key and communicates the signed key to authentication processor 116. Authentication processor 116 may verify the cryptographic signature based on the session key, and, upon successful signature verification, may generate a device key. In an example, the device key comprises a cryptographic key as described herein, which may be associated with the user's session for application 108, and more specifically with user computing device 102. In some examples, the device key comprises a GUID or other identifier, or, in another example, a fingerprint associated with the cryptographic key may be used as the identifier.

Authentication processor 116 may associate the received credential-cipher key and the generated device key in client authentication data store 118, such that the credential-cipher key may later be retrieved based on the device key. Authentication processor 116 then provides the device key to application 108. Application 108 may store the received device key in authentication data store 112. Application 108 may use the credential-cipher key to generate session-resume data based on the user's authentication credentials, which may also be stored in authentication data store 112. However, application 108 does not retain the credential-cipher key at user computing device 102, thereby ensuring that the session-resume data is not stored in combination with the credential-cipher key. If the session-resume data and the credential-cipher key were stored together, it would be possible to access the encrypted user data from data store 110 by simply decrypting the session-resume data using the credential-cipher key and using the resulting authentication credentials to decrypt the encrypted user data. As a result, it would be possible to gain access to the authentication credentials (and, by extension, the decrypted user data) for a potentially unlimited amount of time. Further, it would not be necessary to perform validation when the user's session is resumed (e.g., as may be performed by authentication processor 116 of server 104), thereby reducing the security provided by aspects described herein.

Subsequently, when resuming the user's session, application 108 generates a resume request, which it transmits to authentication processor 116 in order to access the credential-cipher key from client authentication data store 118. In an example, the resume request is signed using the device key, which authentication processor 116 uses to verify the identity of user computing device 102 and to access the associated credential-cipher key from client authentication data store 118. In some examples, the validation operation comprises determining whether the device key has expired, as a device key may be specified to be valid for a predetermined amount of time. In another example, the device key may fail validation when a user has manually indicated that the device key should be invalidated (e.g., as a result of user computing device 102 being lost or stolen, etc.).

In other examples, validation comprises evaluating metadata associated with the resume request, including, but not limited to, an IP address, a time of day, and/or a device type, among other metadata. As an example, the associated credential-cipher key may only be provided for a specific IP address or set of IP addresses (e.g., associated with a user's workplace, a user's home, a user's cell phone carrier, etc.). In some examples, the credential-cipher key may have been ciphered based on an IP address of a user device (which is not retained), such that, even if a user device is stolen, the IP address associated with the user device would also need to be known in order to gain access using the credential-cipher key. As another example, it may be determined that the user typically uses application 108 during a specific range of hours (e.g., 9 AM to 5 PM, 11 AM to 12 PM and 6 PM to 10 PM, etc.), such that a request outside of such hours (e.g., 3 AM, etc.) may be denied. Such evaluations may be specified as user-defined criteria. It will be appreciated that while example criteria are described herein, additional or alternative techniques may be used.

Once application 108 has received the credential-cipher key stored by server 104, application 108 decrypts the session-resume data (e.g., comprising an encrypted representation of the authentication credentials, such as a master password and/or a cryptographic key, etc.), which it then uses to access and decrypt user data stored by data store 110 and/or client data store 114, thereby resuming the user's session without prompting the user for authentication credentials. Thus, the application 108 can use the session-resume data to resume the user's session, but authentication processor 116 must first determine whether the credential-cipher key should be provided to enable application 108 to decrypt the session-resume data. It will be appreciated that the exchanges between user computing device 102 and server 104 are provided as an example, and alternative exchanges may be used according to aspects described herein. For example, rather than user computing device 102 generating the credential-cipher key, the credential-cipher key may instead be generated by authentication processor 116 of server 104. As another example, the credential-cipher key may be stored by a party other than server 104.

Figure 2A:
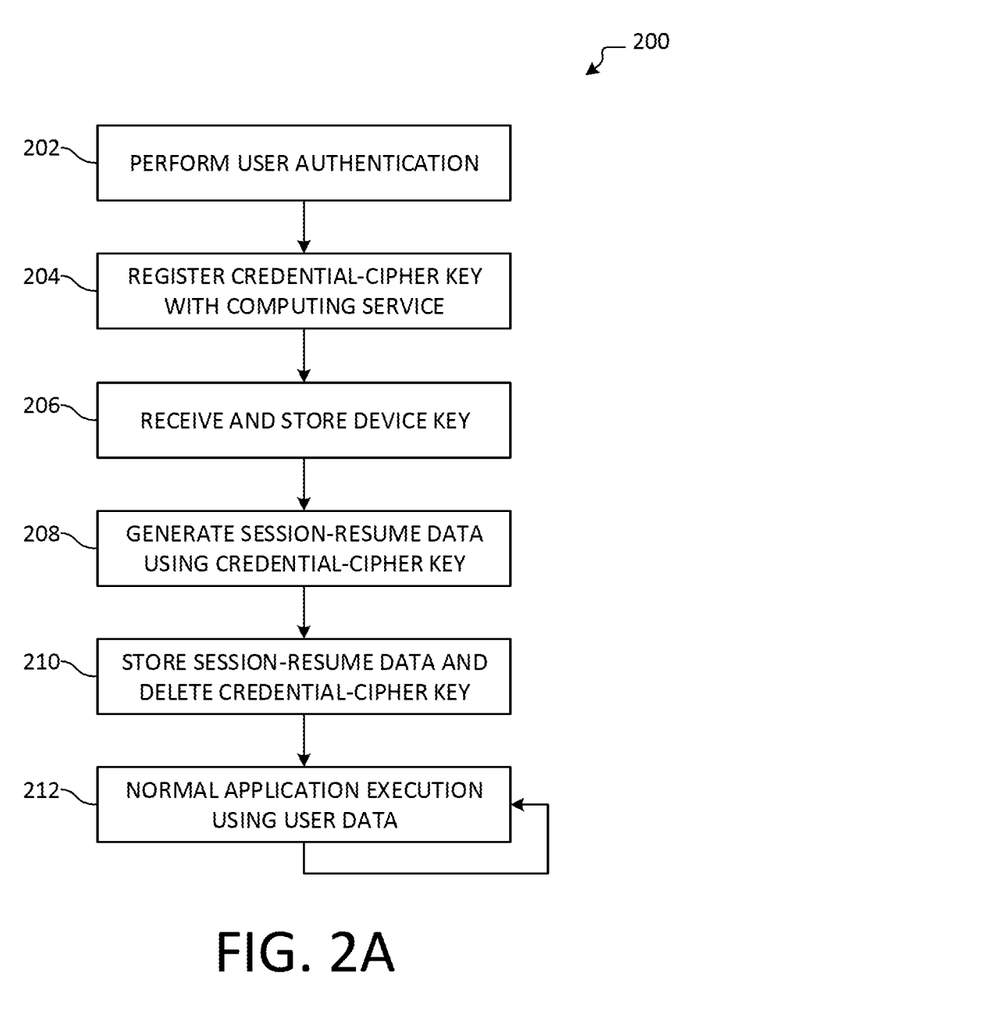
FIG. 2A illustrates an overview of an example method for generating session-resume data in a zero-knowledge environment.

FIG. 2A illustrates an overview of an example method 200 for generating session-resume data in a zero-knowledge environment. In an example, aspects of method 200 are performed by user computing device 102 in FIG. 1. Method 200 begins at operation 202, where user authentication is performed. In an example, user authentication comprises prompting a user for a master password, which is used to decrypt encrypted user data (e.g., as may be stored by a data store, such as data store 110 and/or client data store 114 in FIG. 1). In another example, user authentication comprises receiving or accessing a cryptographic key (e.g., as may be selected on a storage device by a user, provided via a hardware cryptographic device, etc.). In other examples, user authentication comprises communicating with a server of a computing service, such as server 104 in FIG. 1. As described above, a session key may be generated when user authentication is successful (e.g., as may be requested by the user computing device from the computing service as a result of successful local authentication, as may be provided by the computing service in response to successful remote authentication, etc.). It will be appreciated that other types of authentication credentials may be used.

At operation 204, a credential-cipher key is registered with the computing service. In an example, the credential-cipher key is generated locally on the user device. Accordingly, a communication comprising the credential-cipher key may be signed using the session key and provided to the computing service to register the credential-cipher key. It will be appreciated that while method 200 is described with respect to generating and providing the credential-cipher key, in other examples, the credential-cipher key may be generated server-side and received from the computing service.

Moving to operation 206, a device key is received and stored. In examples, the device key is received from the computing service in response to registering the credential-cipher key. In examples wherein the credential-cipher key is generated server-side, the device key may be received as part of the communication comprising the credential-cipher key. In an example, the device key is stored in an authentication data store, such as authentication data store 112 in FIG. 1.

Flow progresses to operation 208, where session-resume data is generated using the credential-cipher key. In an example, the session-resume data is generated by encrypting authentication credentials used to encrypt user data, such as a master password and/or one or more cryptographic keys, as described above. In some examples, the session-resume data comprises metadata, including, but not limited to, an expiration date associated with the session-resume data and/or a fingerprint associated with the credential-cipher key that was used to generate the session-resume data.

At operation 210, the session-resume data is stored and the credential-cipher key is deleted. For example, the session-resume data is stored in an authentication data store, such as authentication data store 112 in FIG. 1. As discussed above, the credential-cipher key is not retained, so as to ensure that encrypted user data is not accessible without either accessing the credential-cipher key to decrypt the generated session-resume data or prompting the user for such authentication credentials.

Moving to operation 212, normal application execution occurs using the user data (e.g., as may be decrypted as a result of the user authentication that was performed at operation 202). Thus, method 200 describes example initialization operations that may be used to prepare an application for resuming a user session once the user closes the application and/or restarts the user computing device, among other examples. Operation 212 is illustrated has having a looping arrow to indicate that normal application execution may occur for various periods of time. Once normal application execution concludes, method 200 terminates.

Figure 2B:
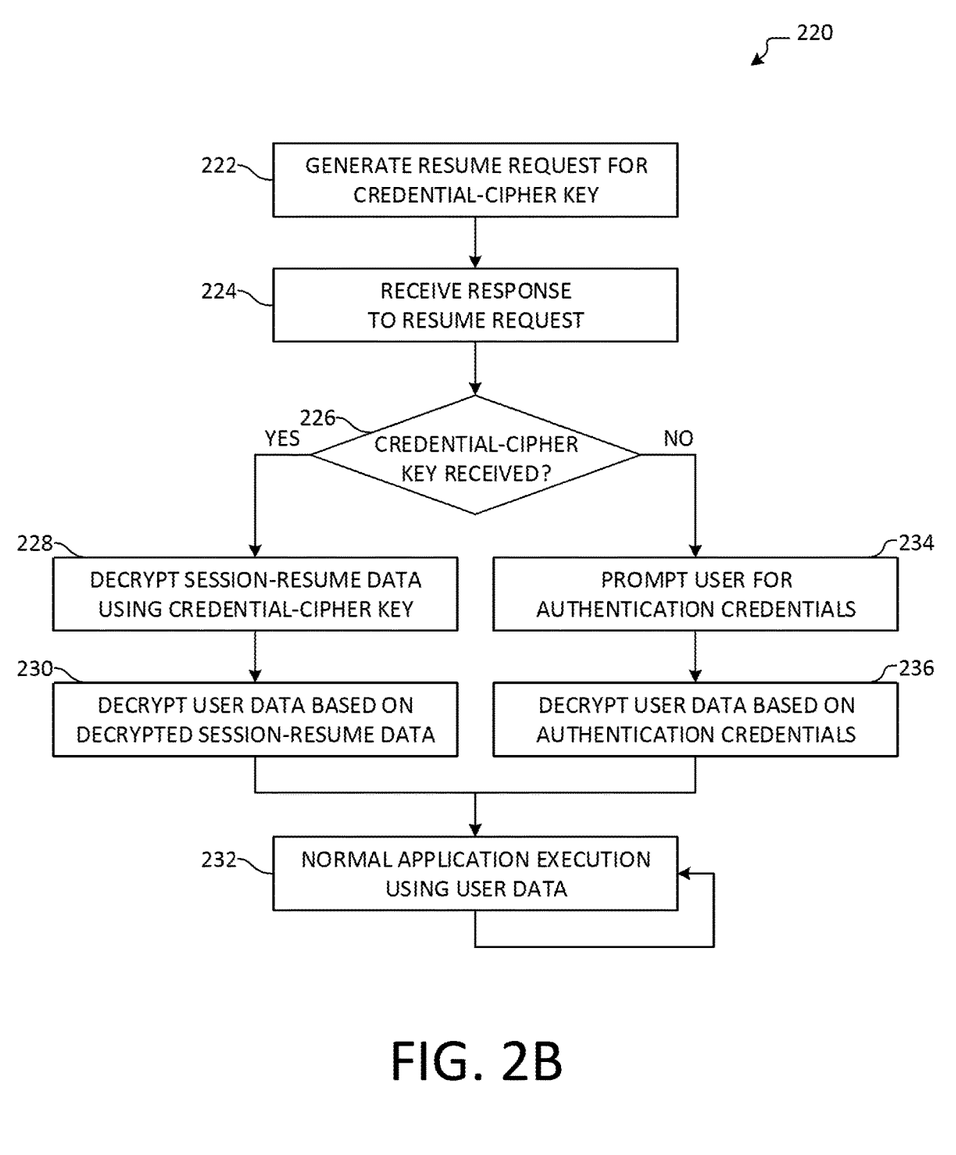
FIG. 2B illustrates an overview of an example method for resuming a user session based on session-resume data in a zero-knowledge environment.

FIG. 2B illustrates an overview of an example method 220 for resuming a user session based on session-resume data in a zero-knowledge environment. For example, aspects of method 220 are performed after the normal application execution described above at operation 212 in FIG. 2A concludes, such as where a user closes and then later reopens an application. In an example, aspects of method 220 are performed by user computing device 102 in FIG. 1. Method 220 begins at operation 222, where a resume request for a credential-cipher key is generated. In examples, the resume request is signed using a device key, such as the device key that was received at operation 206 discussed above with respect to FIG. 2B. In some examples, the resume request comprises a unique identifier associated with the device key, such as a unique identifier or a fingerprint associated with the cryptographic key of the device key.

At operation 224, a response to the resume request is received. In examples, the response comprises an indication as to whether the device key was successfully verified (e.g., as the device key may have expired or been deactivated, etc., according to aspects disclosed herein). In another example, the response comprises a credential-cipher key if the device key was successfully verified by the server. Accordingly, at determination 226, it is determined whether a credential-cipher key was received.

If a credential-cipher key was received, flow branches "YES" to operation 228, where the session-resume data is decrypted using the credential-cipher key. In an example, decrypting the session-resume data comprises discarding the credential-cipher key after the session-resume data is decrypted, thereby ensuring that the credential-cipher key is not retained by the user computing device. Flow progresses to operation 230, where the user data is decrypted based on the decrypted session-resume data. As described above, the decrypted session-resume data may comprise authentication credentials useable to decrypt the user data. At operation 232, normal application execution resumes using the decrypted user data. Operation 232 is illustrated as having an arrow returning to itself, to indicate that normal application execution may continue for any amount of time. Ultimately, flow terminates at operation 232.

If, however, a credential-cipher key was not received (or an incorrect credential-cipher key was received), flow branches "NO" to operation 234, where the user is prompted for authentication credentials. As described above, the user may be asked for authentication credentials (e.g., a master password, to indicate a specific file comprising a cryptographic key, and/or to attach a cryptographic hardware device to the user computing device, among other examples). At operation 236, the user data is decrypted based on the authentication credentials provided by the user. In some examples, aspects of method 200 described above with respect to FIG. 2A are performed to generate session-resume data in order to avoid the need to prompt the user for authentication credentials in the future. Flow progresses to operation 232, wherein normal application execution resumes as was discussed above, after which method 220 terminates.

Figure 2C:
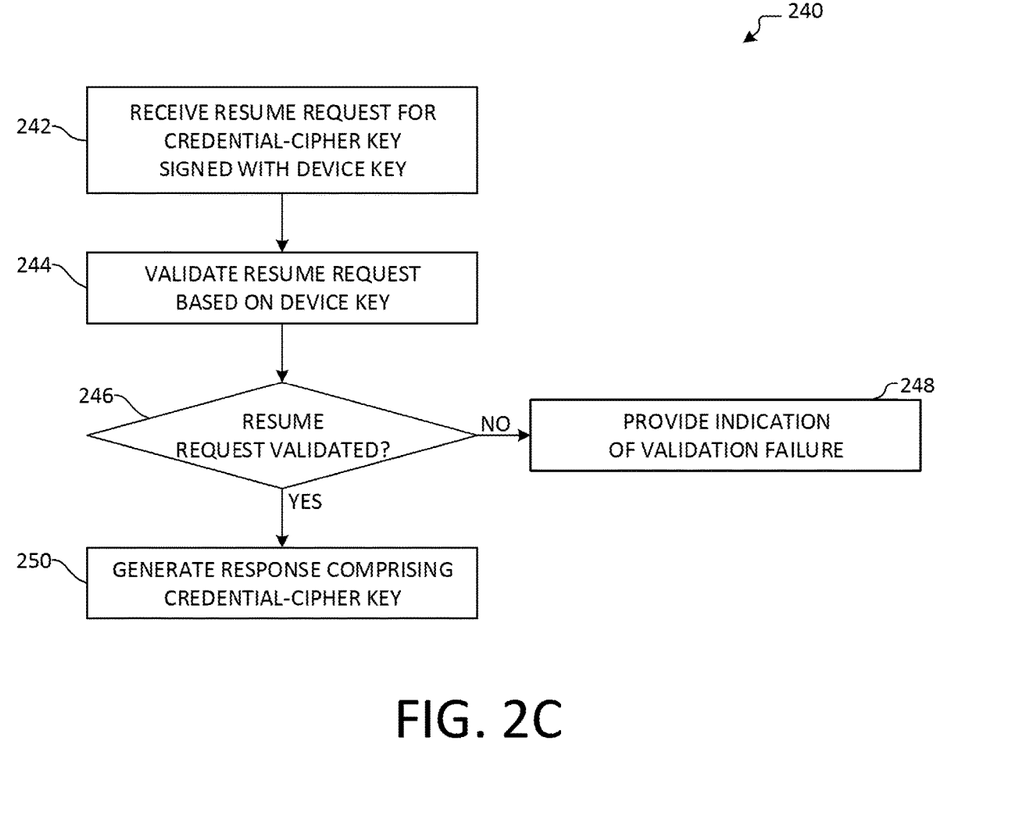
FIG. 2C illustrates an overview of an example method for validating a resume request by a computing service, thereby enabling a client to resume a session in a zero-knowledge environment.

FIG. 2C illustrates an overview of an example method 240 for validating a resume request by a computing service, thereby enabling a client to resume a session in a zero-knowledge environment. In an example, aspects of method 240 are performed by a server, such as server 104 in FIG. 1.

Method 240 begins at operation 242, where a resume request for a credential-cipher key is received. In an example, the resume request is signed with a device key, as described above. In some examples, the resume request comprises an identifier associated with the device and/or the user's session.

At operation 244, the resume request is validated based on the device key. In some examples, validation comprises accessing an authentication data store, such as client authentication data store 118 in FIG. 1. Validation may comprise determining whether the device key has expired by comparing the amount of time that has elapsed from when the device key was issued to a predetermined threshold. In another example, validation may comprise determining whether a user indication to invalidate the device key was received, as may be provided when the associated user computing device is lost or stolen, among other examples. In other examples, it may be determined whether the device key has been replaced by a newer version. As an example, a new device key may be generated in response to each resume request, such that old device keys cannot be reused, thereby limiting the potential for replay attacks. It will be appreciated that a variety of other criteria may be evaluated when validating the resume request, including, but not limited to, evaluating a list of allowed IP addresses and/or evaluating typical time ranges in which resume requests are received, among a variety of user-defined criteria.

At determination 246, it is determined whether the resume request was validated successfully. If it is determined that the resume request was not validated, flow branches "NO" to operation 248, where an indication of validation failure is provided in response to the resume request. In an example, the indication comprises a reason as to why validation failed. In some examples, the validation failure may be logged for later analysis, debugging, and/or auditing purposes. As indicated by the validation failure, the associated user session is no longer active, such that the user would need to re-authenticate with the computing service. Flow terminates at operation 248.

If, however, it is determined that the resume request was validated successfully, flow instead branches "YES" to operation 250, where a response is generated comprising the requested credential-cipher key. In an example, the credential-cipher key may be retrieved from a client authentication data store (e.g., client authentication data store 118 in FIG. 1) based on the device key and/or an associated identifier. In some examples, the generated response may further comprise a new device key, as was discussed above, so as to decrease the susceptibility to replay attacks. Flow terminates at operation 250.

Figure 3:
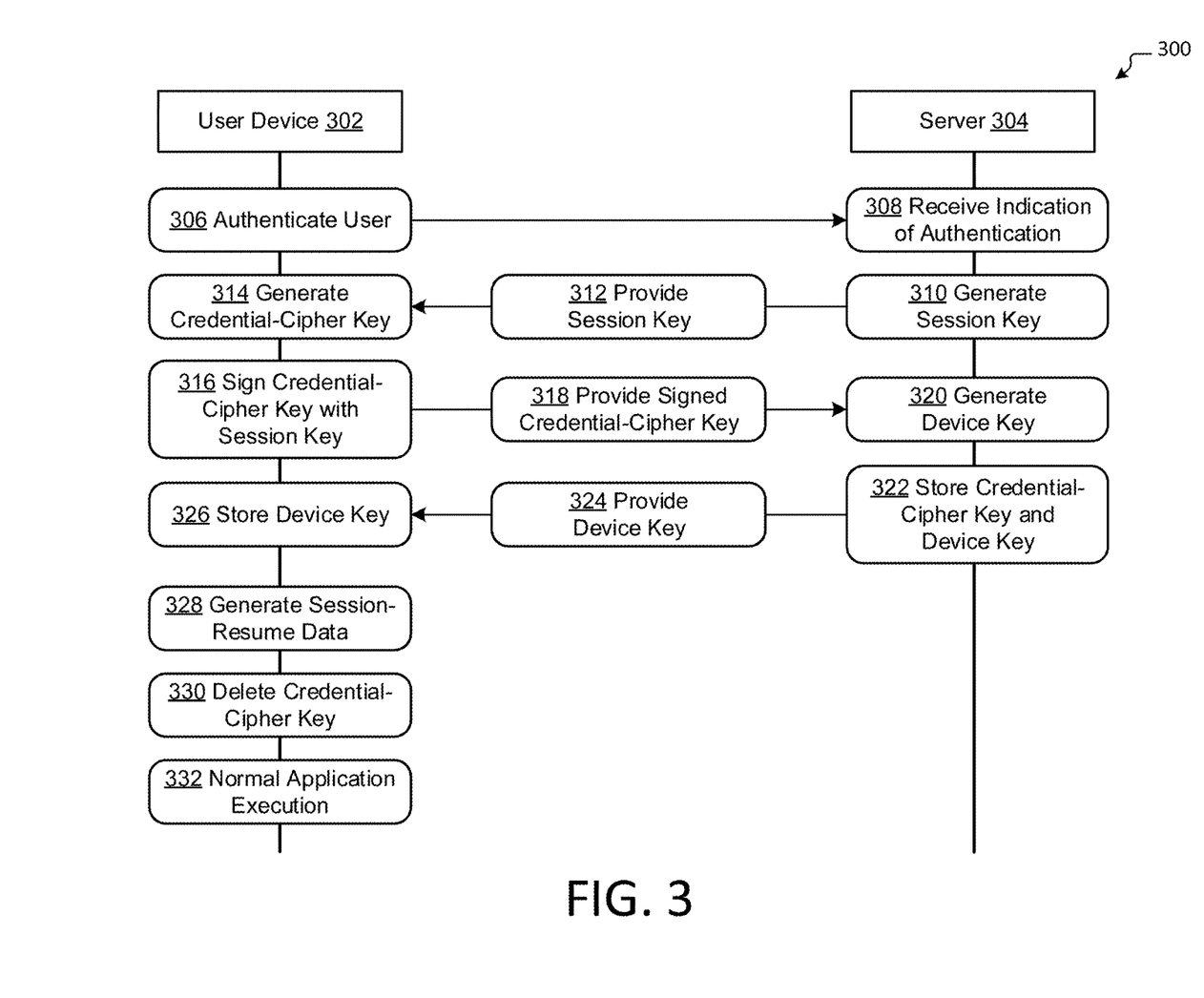
FIG. 3 illustrates an overview of an example method for generating session-resume data between a user device and a server in a zero-knowledge environment.

FIG. 3 illustrates an overview of an example method 300 for generating session-resume data between a user device and a server in a zero-knowledge environment. As illustrated, various aspects of method 300 are performed by particular actors, such as user device 302 (e.g., user computing device 102 in FIG. 1) and server 304 (e.g., server 104). In an example, aspects of method 300 performed on user device 302 may be performed by an application, wherein the application is associated with a computing service provided at least in part by server 304. Method 300 begins at operation 306, where a user is authenticated to start a session. In an example, authenticating the user comprises prompting the user for authentication credentials (e.g., a master password, a cryptographic key, etc.) and subsequently verifying the received authentication credentials. In some examples, user authentication comprises using the received authentication credentials to decrypt encrypted user data, as may be stored by a data store (e.g., data store 110 and/or client data store 114 in FIG. 1). When user authentication is successful, an indication is provided to server 304 at operation 308. In some examples, the indication may comprise an identifier associated with the user (e.g., a username, an email address, a unique identifier, etc.) and/or the computing device.

At operation 310, server 304 generates a session key. As described herein, the session key comprises a cryptographic key, which may be associated with the user's session resulting from operation 306 (e.g., based on an identifier provided at operation 308). In some examples, the session key comprises a GUID or other identifier, or a fingerprint associated with the cryptographic key may be used as the identifier. In examples, the session key is used to sign communications between user device 302 and server 304, thereby enabling server 304 to confirm the identity of user device 302. Flow progresses to operation 312, where the session key is provided, e.g., by server 304, to user device 302.

Moving to operation 314, user device 302 generates a credential-cipher key. In examples, the credential-cipher key is a cryptographic key, which may be used to encrypt the master password, cryptographic key, and/or other authentication credentials used to authenticate the user at operation 306. While method 300 is discussed with respect to user device 302 generating the credential-cipher key, it will be appreciated that, in other examples, the credential-cipher key may be generated elsewhere (e.g., server 304, provided by a hardware cryptographic device, etc.).

At operation 316, the credential-cipher key is cryptographically signed with the session key and, at operation 318, the signed credential-cipher key is provided, e.g., by user device 302, to server 304. Accordingly, at operation 320, server 304 generates a device key as a result of receiving and verifying the signature of the signed credential-cipher key. In an example, the device key comprises a cryptographic key as described herein, which may be associated with the user's session, and more specifically with user device 302. In some examples, the device key comprises a GUID or other identifier, or, in another example, a fingerprint associated with the cryptographic key may be used as the identifier. At operation 322, server 304 stores the credential-cipher key and the device key, such that the credential-cipher key can later be retrieved based on the device key. In some examples, the credential-cipher key and the device key are stored in a client authentication data store, such as client authentication data store 118 in FIG. 1.

Flow progresses to operation 324, where the device key is provided to user device 302 by server 304. In some examples, the communication is signed using the session key, such that user device 302 is able to verify the communication received from server 304. At operation 326, user device 302 stores the device key. In some examples, the device key is stored in an authentication data store, such as authentication data store 112 in FIG. 1.

At operation 328, the credential-cipher key that was generated at operation 314 is used to generate session-resume data. According to aspects disclosed herein, authentication credentials received from the user at operation 306 may be encrypted using the credential-cipher key to generate the session-resume data, such that user data encrypted using the authentication credentials may be decrypted without needing to prompt the user for such authentication credentials again. For example, a master password provided by the user may be encrypted using the credential-cipher key to generate session-resume data, such that the session-resume data may later be decrypted to gain access to the master password. The decrypted master password may then be used to decrypt user data. In some examples, the session-resume data is stored in an authentication data store, such as authentication data store 112 in FIG. 1.

At operation 330, the credential-cipher key is deleted from user device 302. As a result, it is not possible to decrypt the session-resume data without first accessing the credential-cipher key from server 304 (e.g., as was stored at operation 322). Thus, the session-resume data and the credential-cipher key are separated, thereby ensuring that it is not possible to access the user's authentication credentials without communicating with server 304 or, in examples wherein server 304 is inaccessible, prompting the user for such information. Flow progresses to operation 332, where normal application execution occurs. In some examples, application execution may comprise accessing and otherwise using decrypted user data, as may have been decrypted when the user authenticated at operation 306. Flow terminates at operation 332.

While an example flow of operations and communications between user device 302 and server 304 is described above, it will be appreciated that, in other examples, aspects of method 300 are performed in a different order and/or by other entities. For example, the credential-cipher key may be generated by server 304 instead of user device 302.

Figure 4A:
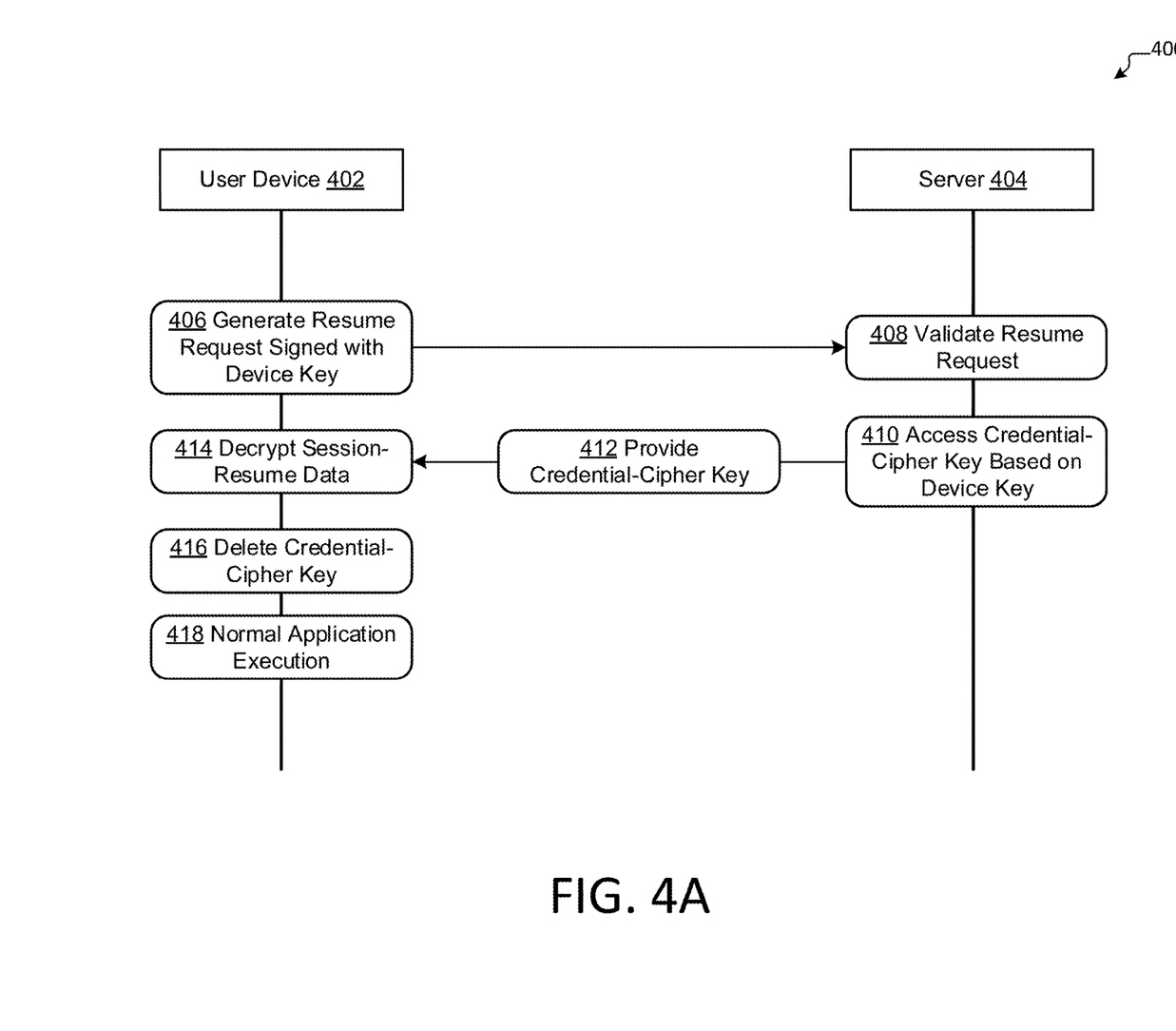
FIG. 4A illustrates an overview of an example method for decrypting session-resume data to resume a user session between a user device and a server in a zero-knowledge environment.

FIG. 4A illustrates an overview of an example method for decrypting session-resume data to resume a user session between a user device and a server in a zero-knowledge environment. For example, aspects of method 400 are performed after normal application execution described above at operation 332 in FIG. 3 concludes, such as where a user closes and then later reopens an application. FIG. 4A illustrates certain aspects of method 400 may be determined by particular actors, such as user device 402 (e.g., user computing device 102 in FIG. 1) and server 404 (e.g., server 104). In an example, aspects of method 400 performed on user device 402 may be performed by an application, wherein the application is associated with a computing service provided at least in part by server 404.

Method 400 begins at operation 406, where a resume request is generated. In examples, the resume request is generated when an application associated with a computing service is opened. For example, a user may have previously indicated that the application should enable the "remember me" functionality described herein, such that the application previously generated session-resume data. In some examples, the resume request is signed using a device key (e.g., as may have been received from a server of the computing service, such as the device key received at operation 326 in FIG. 3).

At operation 408, server 404 validates the resume request. In some examples, validation comprises accessing an authentication data store, such as client authentication data store 118 in FIG. 1. Validation may comprise determining whether the device key used to sign the resume request has expired by comparing the amount of time that has elapsed from when the device key was issued to a predetermined threshold. In another example, validation may comprise determining whether a user indication to invalidate the device key was received by server 404, as may be provided when the associated user computing device (e.g., user device 402) is lost or stolen, among other examples. In other examples, it may be determined whether the device key has been replaced by a newer version. As an example, a new device key may be generated in response to each resume request, such that old device keys cannot be reused, thereby limiting the potential for replay attacks. It will be appreciated that a variety of other criteria may be evaluated when validating the resume request, including, but not limited to, evaluating a list of allowed IP addresses and/or evaluating typical time ranges in which resume requests are received, among a variety of user-defined criteria.

At operation 410, a credential-cipher key is accessed based on the device key. The credential-cipher key may be accessed from a client authentication data store, such as client authentication data store 118 in FIG. 1. Accessing the credential-cipher key may comprise identifying the correct credential-cipher key for user device 402 (e.g., based on an identifier of the device key, based on a cryptographic fingerprint, etc.). In other examples, the resume request is not validated and, as a result, a credential-cipher key is not accessed, as is discussed in greater detail with respect to FIG. 4B below.

Moving to operation 412, the credential-cipher key is provided to user device 402. As described herein, the generated response may further comprise a new device key for user device 402, such that the device key that was used to sign the resume request at operation 406 may no longer be used, thereby decreasing the susceptibility to replay attacks. User device 402 uses the received credential-cipher key to decrypt the session-resume data at operation 414, thereby generating decrypted authentication credentials. As a result of decrypting the session-resume data, the decrypted authentication credentials can be used to decrypt encrypted user data, such that the user's session with the application can be resumed without prompting the user for such authentication credentials.

At operation 416, the credential-cipher key is deleted or is otherwise not retained by user device 402, thereby ensuring that user device 402 is unable to subsequently decrypt the session-resume data without first accessing the requisite credential-cipher key (e.g., by communicating with server 404). Flow then progresses to operation 418, where the user's session is resumed and normal application execution occurs, in a manner similar to if the user had manually provided the authentication credentials. Flow terminates at operation 418.

Figure 4B:
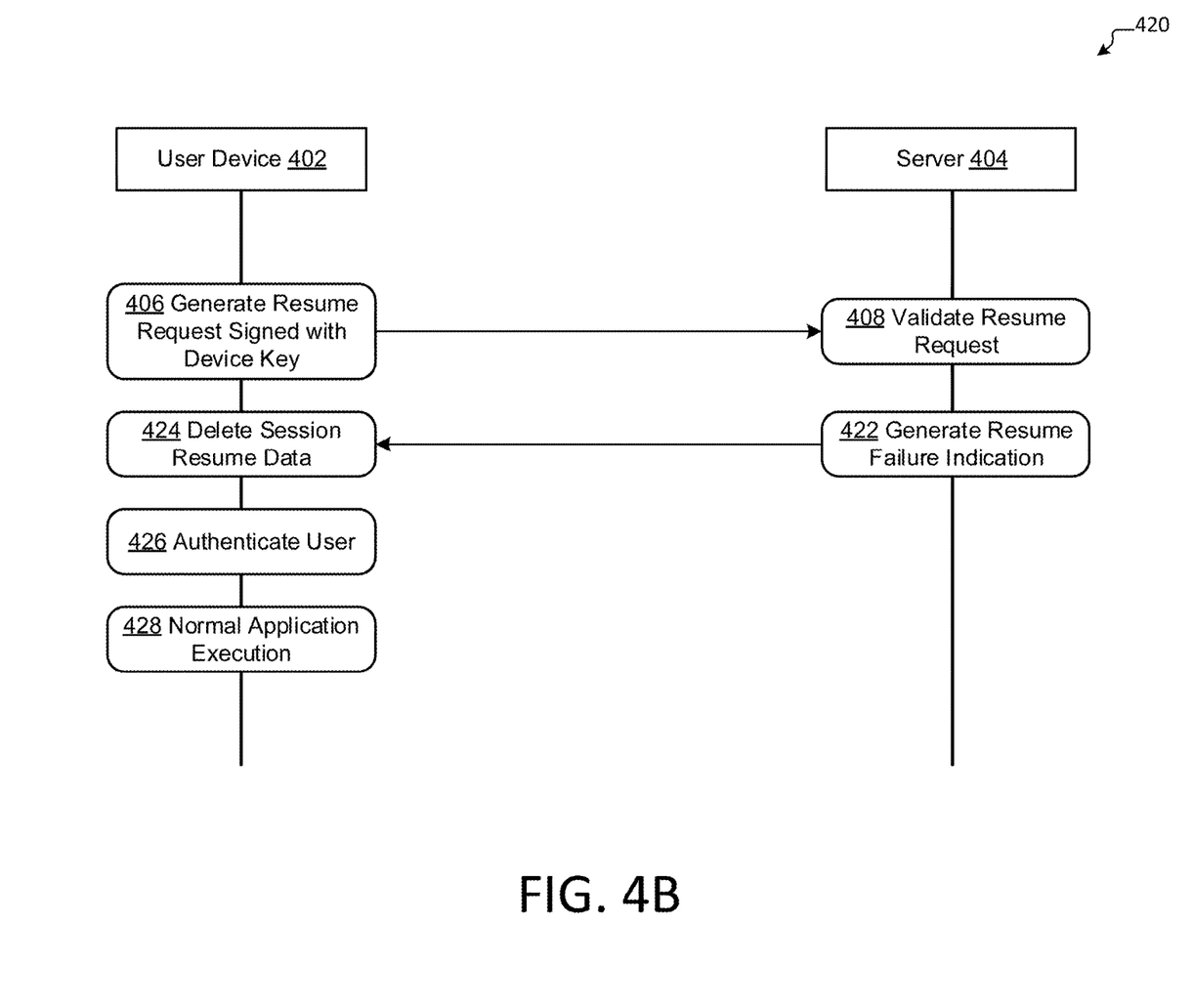
FIG. 4B illustrates an overview of an example method for starting a new user session between a user device and a server when session-resume data cannot be decrypted in a zero-knowledge environment.

FIG. 4B illustrates an overview of an example method 420 for starting a new user session between a user device and a server when session-resume data cannot be decrypted in a zero-knowledge environment. Aspects of method 420 resemble those discussed above with respect to method 400, and are therefore not discussed in detail. Rather, method 420 is provided as an example method for when the resume request is not validated, as may occur at operation 408. Accordingly, flow progresses to operation 422, where a resume failure indication is generated. In an example, the indication comprises a reason as to why validation failed. In some examples, the validation failure may be logged for later analysis, debugging, and/or auditing purposes.

At operation 424, user device 402 deletes the session-resume data when the failure indication is received, as the session-resume data cannot be decrypted without access to the credential-cipher key. Accordingly, as a result of being unable to resume the user's session, user authentication occurs. As discussed above, user authentication comprises prompting the user for authentication credentials, which are then used to decrypt and access the encrypted user data. Flow then progresses to operation 428, where normal application execution occurs. Flow terminates at operation 428. In some instances, aspects of method 300 in FIG. 3 may be performed as part of method 420 in order to regenerate the session-resume data, such that the user need not subsequently provide the authentication credentials.

Figure 5:
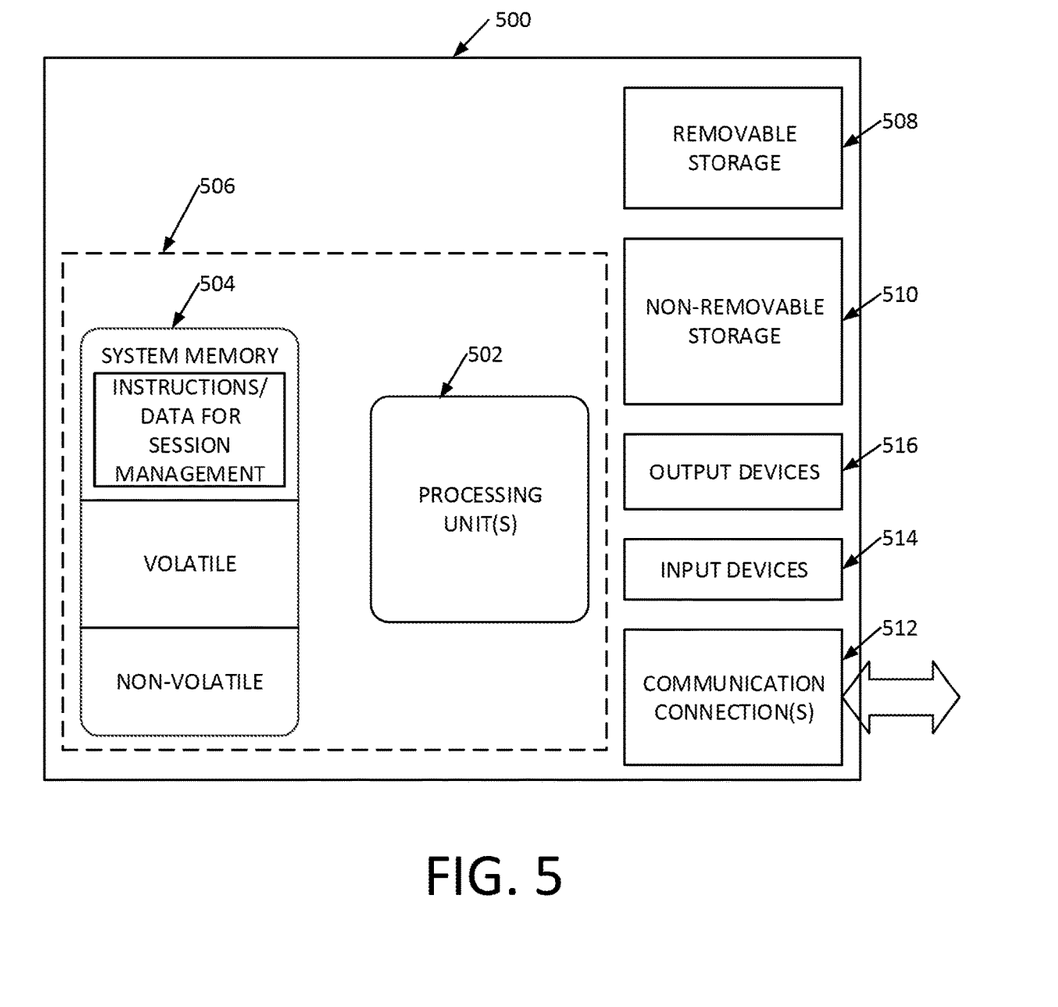
FIG. 5 illustrates an example of a suitable operating environment in which one or more of the present embodiments may be implemented.

FIG. 5 illustrates an example of a suitable operating environment 500 in which one or more of the present embodiments may be implemented. For example, computing devices such as user computing device 102 and server 104, etc., may comprise the system 500. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 500 typically may include at least one processing unit 502 and memory 504. Depending on the exact configuration and type of computing device, memory 504 (storing, among other things, zero-knowledge application module(s), e.g., one or more cryptographic keys, session-resume data, encrypted user data, APIs, programs, etc. and/or other components or instructions to implement or perform the system and methods disclosed herein, etc.) may be volatile (such as RAM), non-volatile (such as ROM, flash memory, etc.), or some combination of the two. This most basic configuration is illustrated in FIG. 5 by dashed line 506. Further, environment 500 may also include storage devices (removable, 508, and/or non-removable, 510) including, but not limited to, magnetic or optical disks or tape. Similarly, environment 500 may also have input device(s) 514 such as a keyboard, mouse, pen, voice input, etc. and/or output device(s) 516 such as a display, speakers, printer, etc. Also included in the environment may be one or more communication connections, 512, such as LAN, WAN, point to point, etc.

Operating environment 500 may include at least some form of computer readable media. The computer readable media may be any available media that can be accessed by processing unit 502 or other devices comprising the operating environment. For example, the computer readable media may include computer storage media and communication media. The computer storage media may include volatile and nonvolatile, removable and non-removable media implemented in any method or technology for storage of information such as computer readable instructions, data structures, program modules or other data. The computer storage media may include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. The computer storage media may not include communication media.

The communication media may embody computer readable instructions, data structures, program modules, or other data in a modulated data signal such as a carrier wave or other transport mechanism and includes any information delivery media. The term "modulated data signal" may mean a signal that has one or more of its characteristics set or changed in such a manner as to encode information in the signal. For example, the communication media may include a wired media such as a wired network or direct-wired connection, and wireless media such as acoustic, RF, infrared and other wireless media. Combinations of the any of the above should also be included within the scope of computer readable media.

The operating environment 500 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

The different aspects described herein may be employed using software, hardware, or a combination of software and hardware to implement and perform the systems and methods disclosed herein. Although specific devices have been recited throughout the disclosure as performing specific functions, one skilled in the art will appreciate that these devices are provided for illustrative purposes, and other devices may be employed to perform the functionality disclosed herein without departing from the scope of the disclosure.

As stated above, a number of program modules and data files may be stored in the system memory 504, such as application 108 in FIG. 1. While executing on the processing unit 502, program modules 508 (e.g., applications, Input/Output (I/O) management, and other utilities) may perform processes including, but not limited to, one or more of the stages of the operational methods described herein such as the methods illustrated in FIGS. 2A-2C, 3, and 4A-4B, for example.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the operating environment 500 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

As will be understood from the foregoing disclosure, one aspect of the technology relates to a system comprising: at least one processor; and memory storing instructions that, when executed by the at least one processor, causes the system to perform a set of operations. The set of operations comprises: receiving authentication credentials from a user to begin a session with a computing service, wherein the authentication credentials are used to generate encrypted user data associated with the computing service; generating a credential-cipher key; providing, to the computing service, the credential-cipher key for storage; receiving, from the computing service, a device key, wherein the device key is associated with the credential-cipher key; encrypting, using the credential-cipher key, the authentication credentials to generate session-resume data; storing the generated session-resume data; and deleting the credential-cipher key from the system. In an example, the set of operations further comprises: receiving an indication to resume the session from the user; generating a resume request for the credential-cipher key, wherein the resume request is signed using the device key; providing the generated resume request to the computing service; when the credential-cipher key is received from the computing service in response to the resume request, decrypting the session-resume data using the credential-cipher key to recover the authentication credentials; decrypting the encrypted user data using the recovered authentication credentials to generate decrypted user data; and resuming the session based on the decrypted user data. In another example, the set of operations further comprises: when the credential-cipher key is not received from the computing service, generating a prompt for authentication credentials; and presenting the generated prompt to the user. In a further example, a second device key is received when the credential-cipher key is received from the computing service, and the set of operations further comprises storing the second device key. In yet another example, providing the credential-cipher key to the computing service for storage comprises signing the credential-cipher key using a session key provided by the computing service. In a further still example, receiving the authentication credentials from the user further comprises receiving a user indication that the authentication credentials should be stored to enable the session to later be resumed. In another example, the authentication credentials comprise at least one of: a master password; and a cryptographic key.

In another aspect, the technology relates to a method for managing a user session of a computing service. The method comprises: receiving, by a computing device, authentication credentials from a user to begin a session with the computing service, wherein the authentication credentials are used to generate encrypted user data associated with the computing service; encrypting, using a credential-cipher key, the authentication credentials to generate session-resume data, wherein the credential-cipher key is not retained by the computing device; storing the generated session-resume data; receiving, from the user, an indication to resume the session; generating a resume request to access the credential-cipher key from the computing service; decrypting the session-resume data using the received credential-cipher key to recover the authentication credentials; decrypting the encrypted user data using the recovered authentication credentials to generate decrypted user data; and resuming the session based on the decrypted user data. In an example, the method further comprises receiving, from the computing service, a device key associated with the credential-cipher key, and the device key is used to sign the resume request. In another example, a second device key is received when the credential-cipher key is accessed from the computing service, and the method further comprises storing the second device key. In a further example, the indication to resume the session comprises receiving an indication to open an application associated with the computing service. In yet another example, receiving the authentication credentials from the user further comprises receiving a user indication that session-resume data should be generated and stored to enable the session to later be resumed. In a further still example, the authentication credentials comprise at least one of: a master password; and a cryptographic key.

In a further aspect, the technology relates to another method for managing a user session of a computing service. The method comprises: receiving, by a computing device, authentication credentials from a user to begin a session with the computing service, wherein the authentication credentials are used to generate encrypted user data associated with the computing service; generating a credential-cipher key; providing, to the computing service, the credential-cipher key for storage; receiving, from the computing service, a device key, wherein the device key is associated with the credential-cipher key by the computing service; encrypting, using the credential-cipher key, the authentication credentials to generate session-resume data; storing the generated session-resume data; and deleting the credential-cipher key from the computing device. In an example, the method further comprises: receiving an indication to resume the session from the user; generating a resume request for the credential-cipher key, wherein the resume request is signed using the device key; providing the generated resume request to the computing service; when the credential-cipher key is received from the computing service in response to the resume request, decrypting the session-resume data using the credential-cipher key to recover the authentication credentials; decrypting the encrypted user data using the recovered authentication credentials to generate decrypted user data; and resuming the session based on the decrypted user data. In another example, the method further comprises: when the credential-cipher key is not received from the computing service, generating a prompt for authentication credentials; and presenting the generated prompt to the user. In a further example, a second device key is received when the credential-cipher key is received from the computing service, and the method further comprises storing the second device key. In yet another example, providing the credential-cipher key to the computing service for storage comprises signing the credential-cipher key using a session key provided by the computing service. In a further still example, receiving the authentication credentials from the user further comprises receiving a user indication that session-resume data should be generated and stored to enable the session to later be resumed. In another example, the authentication credentials comprise at least one of: a master password; and a cryptographic key.

This disclosure described some aspects of the present technology with reference to the accompanying drawings, in which only some of the possible embodiments were shown. Other aspects may, however, be embodied in many different forms and should not be construed as limited to the embodiments set forth herein. Rather, these aspects were provided so that this disclosure was thorough and complete and fully conveyed the scope of the possible embodiments to those skilled in the art.

Although specific aspects were described herein, the scope of the technology is not limited to those specific embodiments. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

What is claimed is:
1. A system comprising:
   at least one processor; and memory storing instructions that, when executed by the at least one processor, causes the system to perform a set of operations, the set of operations comprising:
  receiving authentication credentials from a user to begin a session with a computing service, wherein the authentication credentials are used to generate encrypted user data associated with the computing service;
  generating a credential-cipher key;
  providing, to the computing service, the credential-cipher key for storage;
  receiving, from the computing service, a device key, wherein the device key is associated with the credential-cipher key;
  encrypting, using the credential-cipher key, the authentication credentials to generate session-resume data;
  storing the generated session-resume data; and
  deleting the credential-cipher key from the system.

2. The system of claim 1, wherein the set of operations further comprises:
  receiving an indication to resume the session from the user;
  generating a resume request for the credential-cipher key, wherein the resume request is signed using the device key;
  providing the generated resume request to the computing service;
  when the credential-cipher key is received from the computing service in response to the resume request, decrypting the session-resume data using the credential-cipher key to recover the authentication credentials;
  decrypting the encrypted user data using the recovered authentication credentials to generate decrypted user data; and
  resuming the session based on the decrypted user data.

3. The system of claim 2, wherein the set of operations further comprises:
  when the credential-cipher key is not received from the computing service, generating a prompt for authentication credentials; and
  presenting the generated prompt to the user.

4. The system of claim 2, wherein a second device key is received when the credential-cipher key is received from the computing service, and wherein the set of operations further comprises storing the second device key.

5. The system of claim 1, wherein providing the credential-cipher key to the computing service for storage comprises signing the credential-cipher key using a session key provided by the computing service.

6. The system of claim 1, wherein receiving the authentication credentials from the user further comprises receiving a user indication that the authentication credentials should be stored to enable the session to later be resumed.

7. The system of claim 1, wherein the authentication credentials comprise at least one of:
  a master password; and
  a cryptographic key.

8. A method for managing a user session of a computing service, comprising:
  receiving, by a computing device, authentication credentials from a user to begin a session with the computing service, wherein the authentication credentials are used to generate encrypted user data associated with the computing service;
  encrypting, using a credential-cipher key, the authentication credentials to generate session-resume data, wherein the credential-cipher key is not retained by the computing device;
  storing the generated session-resume data;
  receiving, from the user, an indication to resume the session;
  generating a resume request to access the credential-cipher key from the computing service;
  decrypting the session-resume data using the received credential-cipher key to recover the authentication credentials;
  decrypting the encrypted user data using the recovered authentication credentials to generate decrypted user data; and
  resuming the session based on the decrypted user data.

9. The method of claim 8, further comprising receiving, from the computing service, a device key associated with the credential-cipher key, and wherein the device key is used to sign the resume request.

10. The method of claim 9, wherein a second device key is received when the credential-cipher key is accessed from the computing service, and wherein the method further comprises storing the second device key.

11. The method of claim 8, wherein the indication to resume the session comprises receiving an indication to open an application associated with the computing service.

12. The method of claim 8, wherein receiving the authentication credentials from the user further comprises receiving a user indication that session-resume data should be generated and stored to enable the session to later be resumed.

13. The method of claim 8, wherein the authentication credentials comprise at least one of:
  a master password; and
  a cryptographic key.

14. A method for managing a user session of a computing service, comprising:
  receiving, by a computing device, authentication credentials from a user to begin a session with the computing service, wherein the authentication credentials are used to generate encrypted user data associated with the computing service;
  generating a credential-cipher key;
  providing, to the computing service, the credential-cipher key for storage;
  receiving, from the computing service, a device key, wherein the device key is associated with the credential-cipher key by the computing service;
  encrypting, using the credential-cipher key, the authentication credentials to generate session-resume data;
  storing the generated session-resume data; and
  deleting the credential-cipher key from the computing device.

15. The method of claim 14, further comprising:
  receiving an indication to resume the session from the user;
  generating a resume request for the credential-cipher key, wherein the resume request is signed using the device key;
  providing the generated resume request to the computing service;
  when the credential-cipher key is received from the computing service in response to the resume request, decrypting the session-resume data using the credential-cipher key to recover the authentication credentials;

decrypting the encrypted user data using the recovered authentication credentials to generate decrypted user data; and resuming the session based on the decrypted user data.

16. The method of claim 15, further comprising:

when the credential-cipher key is not received from the computing service, generating a prompt for authentication credentials; and presenting the generated prompt to the user.

17. The method of claim 15, wherein a second device key is received when the credential-cipher key is received from the computing service, and wherein the method further comprises storing the second device key.

18. The method of claim 14, wherein providing the credential-cipher key to the computing service for storage comprises signing the credential-cipher key using a session key provided by the computing service.

19. The method of claim 14, wherein receiving the authentication credentials from the user further comprises receiving a user indication that session-resume data should be generated and stored to enable the session to later be resumed.

20. The method of claim 14, wherein the authentication credentials comprise at least one of:

a master password; and a cryptographic key.

* * * * *